Dec. 1, 1942.  E. B. NEFF  2,304,012
PARKING METER
Filed Oct. 6, 1941  2 Sheets-Sheet 1

INVENTOR.
Edward B. Neff
BY Oberlin, Limbach & Day
ATTORNEYS

Dec. 1, 1942.  E. B. NEFF  2,304,012
PARKING METER
Filed Oct. 6, 1941  2 Sheets-Sheet 2

INVENTOR.
Edward B. Neff
BY Oberlin, Limbach & Day
ATTORNEYS

Patented Dec. 1, 1942

2,304,012

UNITED STATES PATENT OFFICE 2,304,012

PARKING METER

Edward B. Neff, Cleveland Heights, Ohio

Application October 6, 1941, Serial No. 413,787

8 Claims. (Cl. 194—72)

This invention relates as indicated to parking meters and the like and more particularly to such meters of the manually operated type.

Various meters have been devised which upon insertion of a coin will register the period of time to which the operator is entitled to space for parking an automobile, but all such meters have incorporated various features which have proven disadvantageous. The manual type of meter offers certain advantages over the wholly automatic meter in that maintenance charges are reduced since it is not necessary for maintenance men to periodically wind the same. Also a positive acting manually operated meter may be constructed which is much less likely to jam or fail to operate than meters which may be started in operation merely by the weight of the inserted coin. The servicing of some meters has proven difficult and expensive due to the necessity of either repairing the meter on the spot, such meter thus being out of operation during the course of repairs, or of removing the entire meter to a work shop. Also such meters have often been quite expensive to manufacture so that the cost of installing a large number in a city has generally been high and has militated against the more wide spread use of such meters. A difficulty encountered in the past with the manually operated type of meter has been that since the inserted coin has generally served as a key or connecting means between the handle and winding means of the clock it has been possible to turn the handle insufficiently to wind the clock for the entire period to which the operator is entitled and then later to return, prior to the expiration of the time period, and again wind the clock, the same coin still acting as the connecting means. It will thus be seen that in such meters if the handle be not rotated sufficiently to obtain the full time period the coin will not be discharged from the mechanism and it will be possible to obtain further time by later winding, employing the same coin.

It is, therefore, a primary object of this invention to provide a parking meter in which all of the operating mechanism is readily removable and replaceable so that such mechanism may be taken to a work shop for repairs with a duplicate mechanism in operation in the interim.

Another object of this invention is to provide a parking meter of the manual type in which a coin can serve for but one winding of the time clock, such coin being ineffective to cause further winding of the clock even when the operating handle has not been fully rotated in the first instance and is later manipulated prior to expiration of the allotted time period.

Still another object of this invention is to provide a meter of the type above described which will be inexpensive of manufacture and require a minimum of maintenance.

Other objects of this invention will appear as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figures 1, 2, 9:
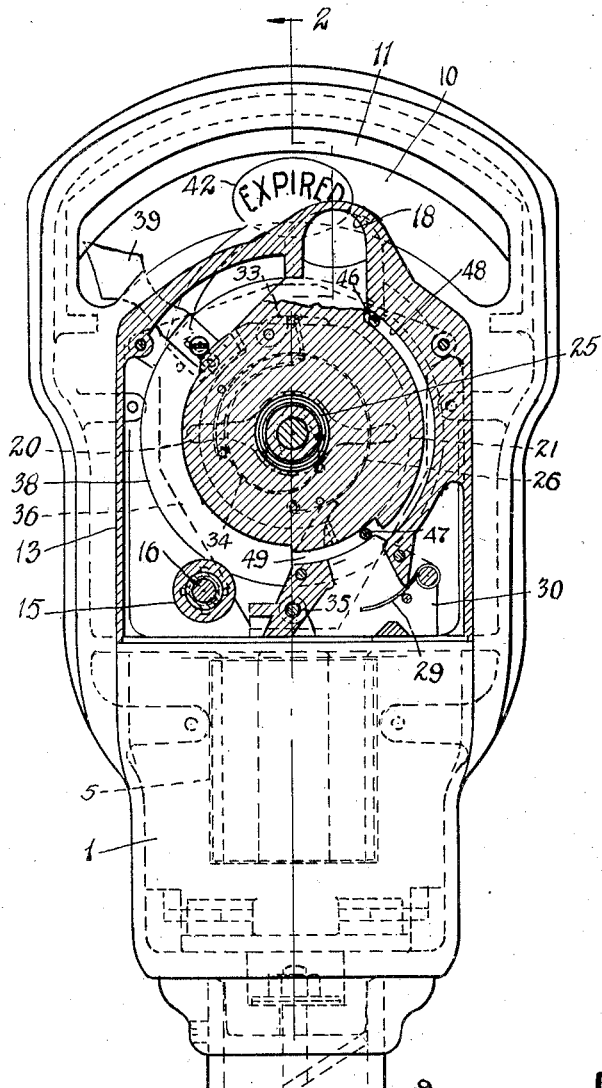
Fig. 1 is a front elevational view of the meter of this invention taken partly in cross section along the line 1—1 on Fig. 2.
Fig. 2 is a cross sectional view of such meter taken along the line 2—2 on Fig. 1.
Fig. 9 is a detail fragmentary view of such time indicator means showing the operation of the same.

Referring now more particularly to such drawings, the meter of this invention is adapted to be enclosed in a housing comprising front and rear members 1 and 2 respectively. Such housing is divided into an upper chamber 3 and a lower chamber 4 in which lower chamber a coin collecting box 5 is located to which access may be had by means of hinged door 6 secured by lock 7. The housing may be mounted on a conventional pipe stand 8 as by internally secured bolt means 9. In the upper portion of housing member 1 is a window 10 which is backed along its upper edge by an indicator panel 11 bearing time indicia thereon. A similar window 12 may be provided in the upper portion of housing member 2.

Removably secured in the face of housing member 1 is a panel 13 held in place by an upstanding lug 14 adapted to hook under the upper lip of the opening in casing member 1 and a screw lock 15 secured to a threaded pin 16 carried by a boss 17 on the inner face of housing member 2. It will thus be seen that the panel may be removed from the housing and replaced by another panel with a minimum of trouble.

Figure 3:
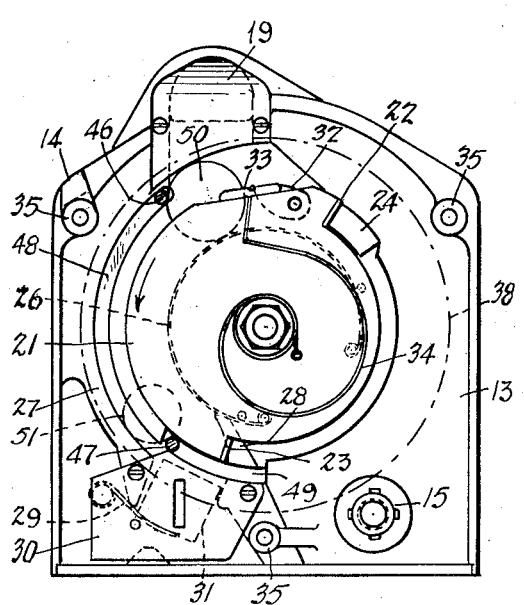
Fig. 3 is an elevational view of the inner face of the mechanism supporting panel of such meter taken along the line 3—3 on Fig. 2.
Figure 8:
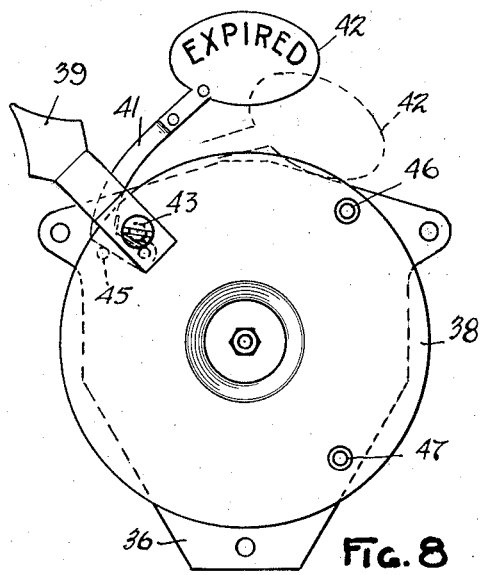
Fig. 8 is an elevational view of the clock winding and clock mounting means as well as the time indicator means.
Figures 4, 7:
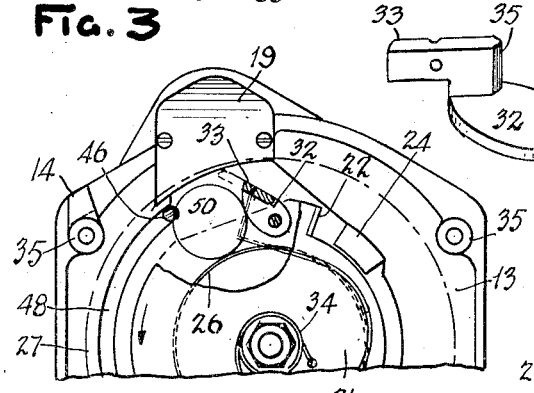
Fig. 4 is a fragmentary view similar to Fig. 3 but illustrating the operation of the mechanism upon rotation of the handle.
Fig. 7 is a detail view of the cam and finger means operative by the inserted coin to connect the handle to the clock wind means.

Panel 13 is provided with an upward bulge having a coin slot 18 therein, a metal baffle plate 19 serving to direct an inserted coin downwardly into the guideway described below. Rotatably mounted on panel 13 is a handle 20 secured to a plate 21 spaced from the inner face of panel 13 and carrying upstanding flanges 22 and 23 adapted to engage opposite sides of lug 24 on panel 13. A torsion spring 25 operates to resiliently hold flange 22 in engagement with lug 24 as shown in Fig. 3. A curved spring 26 secured to the inner face of panel 13 serves, in conjunction with raised rib or shoulder 27 on the inner face of the panel, to form an arcuate channel or guideway, the inner face of which is partially enclosed by plate 21. Plate 21 is spaced from the inner face of panel 13 sufficiently to permit a coin, such as a penny or five cent piece, to slide freely therebetween. Likewise, resilient side member 26 is spaced from shoulder 27 sufficiently to permit such coins to pass therebetween. Such guideway or channel is terminated by a curved shoulder 28 extending from the inner side of the channel and operative to direct a coin downwardly from such channel into engagement with leaf spring 29 under a retaining plate 30. There the coin will remain until discharged by yielding of spring 29 upon insertion of another coin. A glass window 31 may be provided in panel 13 so that the coin resting on spring 29 may be inspected to identify counterfeit coins and slugs. Pivotally secured to plate 21 adjacent flange 22 is a cam member 32 carrying a finger 33. Such finger 33 will normally be held against the flattened edge of plate 21 by means of spring 34. The shoulder 35 formed by finger 33 serves as a stop to limit pivotal movement of cam 32 and finger 33 against the force of spring 34. Screwed to upstanding bosses 35 on the inner face of panel 13 is a panel 36 on which is mounted a clock 37. Located between plate 36 and plate 21 is a circular disc 38 mounted for rotative movement with the clock mechanism. To such disc is fixed a pointer 39 adapted to travel along the arcuately curved indicator panel 11 upon rotation of the disc. Pivotally mounted at 40 on plate 36 is an angular arm 41 adapted to carry indicator such as 42 to indicate that the allotted time period has expired. The screw 43 by which pointer 39 is secured to disc 38 is operative to engage upstanding lug 44 on arm 41 to move such arm about its pivot 40 until it engages stop 45. Normally, therefore (the clock mechanism being partly wound), screw 43 will be in engagement with lug 44 causing indicator 42 to be elevated as shown in Figs. 1 and 9, and further rotative movement of disc 38 and pointer 39 will be prevented by stop 45. When, however, the clock has been further wound by insertion of a coin, as explained below, disc 38 will of course have been rotated in a clockwise direction, as viewed in Figs. 1 and 8, moving pointer 39 to the right on panel 11 and permitting indicia 42 to drop by gravity, as illustrated in dotted line in Fig. 8. Should such indicia fail to fall of its own accord, the inclined arm of pointer 39 will engage arm 41 and positively depress the latter.

As above indicated, it is contemplated that the meter of this invention be operable by either a five cent piece or a penny to obtain proportionate time periods. Ordinarily such meters will be designed to provide one hour's time for five cents and twelve minutes' time for a penny. However, it will be understood that window 10 and panel 11, forming in conjunction with pointer 39 the time indicating dial, may be so proportioned and numbered as to include any desired time interval. Also by merely revising the critical dimensions of my mechanism such mechanism may be adapted to any desired size of coin.

Disc 38 also carries two pins 46 and 47, both of which are adapted to extend into the guideway formed between resilient side member 26 and shoulder 27, although at different distances from the outer circumference of such guideway. Grooves 48 and 49 are provided in which the ends of such respective pins may travel, thus avoiding the necessity for careful machining of panel 13 to obtain a minimum of clearance between the ends of the pins and such panel.

Figure 6:
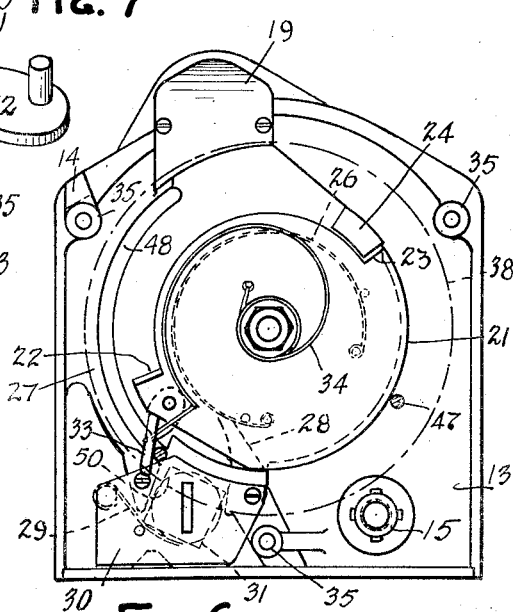
Fig. 6 is a view similar to Fig. 3 but showing the mechanism with the handle fully rotated.
Figure 5:
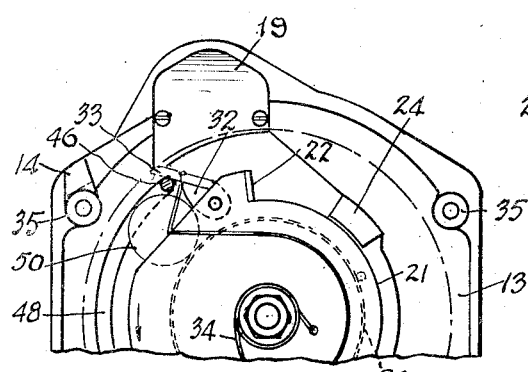
Fig. 5 is a fragmentary view similar to Fig. 3 but showing the operation of the mechanism upon rotation of the handle to a greater degree than illustraterd in Fig. 4.

Referring now more particularly to Figs. 3 to 6 inclusive, the operation of my new device may be explained as follows. As shown in Fig. 3, a five cent piece 50 has just been inserted in slot 18 and directed by baffle plate 19 into the coin guideway where it is held below by resilient side member 26, on either side by panel 13 and plate 21, to the right by cam 32 and to the left by pin 46. Handle 20 is then turned in a clockwise direction as viewed in Fig. 1 thereby rotating plate 21 in a counterclockwise direction, as viewed in Figs. 4 to 6. As plate 21 rotates, cam 32 engages the coin 50, moving such cam in a clockwise direction against the force of spring 34. It will be noticed that by such movement of the cam, finger 33 is moved into position to engage pin 46 upon further rotation of plate 21. As plate 21 continues to turn, finger 33 engages pin 46, as shown in Fig. 5, and the coin 50 is forced between resilient side member 26 and pin 46 by the yielding of such resilient side member. The coin is then free to drop along the guideway until it engages pin 47. The handle 20 may then be further turned until up-turned flange 23 engages lug 24, coin 50 being permitted to drop down onto leaf spring 29, as shown in Fig. 6. If another coin is already resting on such spring, coin 50 will remain in the lower end of the guideway until again engaged by cam 32, when such cam, acting in conjunction with guide shoulder 28, will force coin 50 downwardly to replace the coin resting on spring 29, such latter coin being discharged by yielding of spring 29. Since finger 33 acts to connect handle 20 with pin 46 the further rotation of handle 20 thus serves to rotate disc 38 and thereby wind the clock mechanism. It will be at once obvious from the foregoing that coin 50 cannot possibly be employed to obtain more time than that to which the operator is entitled since when handle 20 is released, finger 33 immediately escapes from pin 46 and returns to the position illustrated in Fig. 3. Only insertion of another coin will be effective to again elevate finger 33 into operative position.

As above noted, the device of this invention is also adapted to be operated by the insertion of a different size coin, such as a penny, to obtain a proportionate amount of time. Such penny 51, being of smaller diameter than the five cent piece 50, will, upon insertion in slot 18, pass between pin 46 and resilient side member 26 and drop down into engagement with pin 47. Here it will remain until handle 20 is rotated sufficiently to bring cam 32 into engagement therewith. Since coin 51 engages pin 47 approximately on center, and since side member 26 is relatively stiff and unyielding at this point, cam 32 is not operative to force coin 51 between pin 47 and member 26, but on the contrary, acts through coin 51 to move pin 47 until coin 51 is forced downwardly onto supporting spring 29. In this case it will be noted that the coin actually serves as the connecting link between the handle and the winding mechanism so that it would be possible to turn the handle for only a portion of the allotted time (in this case twelve minutes), and then return before such time had expired and again rotate the handle. In the case of such a short period of time, however, this is not a serious drawback as it would require very frequent trips to the meter to maintain the same in operation.

It will therefore be seen that the objects of this invention have been accomplished in a relatively simple manner, providing a mechanism inexpensive of construction and maintenance and not subject to misuse as have been meters of this type in the past.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In parking meters and the like, a clock, winding means for said clock, handle means, spaced resilient means and a stop, guide means adapted to conduct a coin into simultaneous engagement with said resilient means and said stop, and means connected to said handle means operative upon rotation of said handle means to engage such coin and to be moved thereby into position to engage said winding means, and upon further rotation of said handle to move such coin past said stop by yielding of said resilient means.

2. In parking meters and the like, a housing, a clock mounted in said housing, winding means for said clock, handle means rotatably mounted on said housing, a coin guideway including a resilient side member, stop means in said guideway spaced from said resilient side member, and means connected to said handle means operative upon rotation of said handle means to engage a coin held in said guideway by said stop and to be moved thereby into position to engage said winding means, and upon further rotation of said handle means to force such coin past said stop by yielding of said resilient means.

3. In parking meters and the like, a housing, a clock mounted in said housing, winding means for said clock, handle means rotatably mounted on said housing, a coin guideway including a resilient side member, stop means in said guideway spaced from said resilient side member insufficiently to allow a selected coin to pass therebetween, means pivotally connected to said handle means operative upon rotation of said handle means to engage a coin held in said guideway by said stop and to be pivotally moved thereby into position to engage said winding means, and means limiting the pivotal movement of said pivotally mounted means, said pivotally mounted means being operative upon further rotation of said handle means to force such coin past said stop by yielding of said resilient member to permit further free movement of such coin along said guideway.

4. In parking meters and the like, a housing, a clock mounted in said housing, winding means for said clock, handle means rotatably mounted on said housing, a coin guideway including a resilient side member, stop means in said guideway spaced from said resilient side member insufficiently to allow a selected coin to pass therebetween, cam means pivotally connected to said handle means operative upon rotation of said handle means to engage a coin held in said guideway by said stop, finger means associated with said cam means operative upon pivotal movement of said cam means to move into position to engage said winding means, means limiting the movement of said finger means, said cam means being operative upon further rotation of said handle means to force such coin past said stop by yielding of said resilient member to permit further free movement of such coin along said guideway.

5. In parking meters and the like, a housing, a clock mounted in said housing, winding means for said clock, handle means rotatably mounted on said housing, a coin guideway including a resilient side member, stop means in said guideway spaced from said resilient side member insufficiently to allow a selected coin to pass therebetween, cam means pivotally connected to said handle means operative upon rotation of said handle means to engage a coin held in said guideway by said stop and to be pivotally moved thereby into position to engage said winding means, resilient means adapted to resist such pivotal movement, and further stop means associated with said handle means adapted to limit pivotal movement of said cam means, said cam means being operative upon further rotation of said handle means to force such coin past said first named stop by yielding of said resilient member and to wind said clock.

6. In parking meters and the like, a housing, a clock mounted in said housing, handle means rotatably mounted on said housing, an arcuate coin guideway including a resilient side member, clock winding means including an element extending into said guideway and spaced from said resilient side member insufficiently to permit a selected coin to pass therebetween, cam means pivotally connected to said handle means operative upon rotation of said handle means to engage a coin held in said guideway by said element and to be pivotally moved thereby into position to engage said element, and stop means adapted to limit pivotal movement of said cam means, said cam means being operative upon further rotation of said handle means to force such coin past said element by yielding of said resilient side member and to engage said element to wind said clock.

7. In parking meters and the like, a housing, a clock mounted in said housing, handle means rotatably mounted on said housing, resilient means tending to rotate said handle, stop means limiting rotation in either direction, an arcuate coin guideway having a resilient side member, clock winding means including an element extending into said guideway and spaced from said resilient side member insufficiently to permit a selected coin to pass therebetween, said element being operative to travel along the path of said arcuate guideway to wind said clock, cam means pivotally connected to said handle means operative upon rotation of said handle means against the force of said resilient means to engage a coin held in said guideway by said element, finger means attached to said cam means adapted to be moved into position to engage said element upon such pivotal movement of said cam means, resilient means adapted to resist such pivotal movement, and stop means adapted to limit such pivotal movement, said cam means being operative upon further rotation of said handle means to force such coin past said element by yielding of said resilient side member and said finger means being operative upon such further rotation of said handle means to engage said element to wind said clock.

8. In parking meters and the like, a housing, a clock mounted in said housing, handle means rotatably mounted on said housing, stop means limiting rotation of said handle in either direction, spring means normally holding said handle means in engagement with one of said stop means, an arcuate coin guideway having an inner resilient side members, means operative upon rotation to wind said clock, a pin mounted on said last named means and extending into said guideway, said pin being spaced from said resilient side member to a degree slightly less than the diameter of a selected coin, cam means pivotally connected to said handle means operative upon rotation of said handle means against the force of said spring means to engage a coin held in said guideway by said pin, and finger means on said cam means, said cam means being operative upon further rotation of said handle to move said finger into position to engage said pin and to thereafter force such coin past said pin in said guideway by yielding of said resilient side member, and said finger being operative to engage said pin and move said pin in an arcuate path along said guideway to wind said clock as said handle is rotated.

EDWARD B. NEFF.